United States Patent
Hwang et al.

(10) Patent No.: US 6,252,700 B1
(45) Date of Patent: Jun. 26, 2001

(54) ERBIUM DOPED FIBER AMPLIFIER SUITABLE FOR LONG WAVELENGTH LIGHT SIGNAL

(75) Inventors: Seong-taek Hwang, Pyeongtaek; Soo-young Yoon, Yongin; Lars Johan Albinsson Nilsson, Suwon, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/346,706

(22) Filed: Jul. 2, 1999

(30) Foreign Application Priority Data

Jul. 2, 1998 (KR) .................................................. 98-26651

(51) Int. Cl.[7] ...................................................... H01S 3/06
(52) U.S. Cl. ........................................... 359/337; 359/341
(58) Field of Search ................................... 359/337, 341, 359/177; 385/27; 372/4

(56) References Cited

U.S. PATENT DOCUMENTS

| | | | |
|---|---|---|---|
| 5,808,786 | * | 9/1998 | Shibuya ................................ 359/341 |
| 5,914,808 | * | 6/1999 | Mitsuda et al. ...................... 359/341 |
| 6,104,527 | * | 8/2000 | Yang ..................................... 359/341 |

OTHER PUBLICATIONS

Ole Lumholt et al., "Optimum Position of Isolators within Erbium–Doped Fibers", Jun. 1992, IEEE Photonics Technology Letters, vol. 4, No. 6, pp. 568–570.*

M.N. Zervas et al. "Efficient Erbium–Doped Fiber Amplifiers Incorporating an Optical Isolator", IEEE Journal of Quantum Electronics, vol. 31, No. 3, pp. 472–480, 1995.*

* cited by examiner

Primary Examiner—Thomas H. Tarcza
Assistant Examiner—Deandra M. Hughes
(74) Attorney, Agent, or Firm—Robert E. Bushnell, Esq.

(57) ABSTRACT

An erbium doped fiber amplifier (EDFA) suitable for amplifying a long wavelength light signal in the range in the 1570 to 1610 nm band, includes a pump light source for generating pump light in the 980 or 1480 nm band, a light coupler for receiving the pump light from the pump light source and coupling the same to the received light signal, first and second optical fibers doped with erbium ions, for amplifying the received light signal by the pump light, and an isolator positioned at a point between the first and second erbium doped optical fibers (EDFs). The gain and noise figure of the EDFA for amplifying received light signal in a long wavelength band can be improved. Also, an EDFA suitable for amplifying received light signal in the 1570 to 1610 nm band can be attained.

12 Claims, 2 Drawing Sheets

ERBIUM DOPED FIBER AMPLIFIER SUITABLE FOR LONG WAVELENGTH LIGHT SIGNAL

CLAIM OF PRIORITY

This application makes reference to, incorporates the same herein, and claims all benefits accruing under 35 U.S.C §119 from an application entitled *Erbium Doped Fiber Amplifier Suitable For Long Wavelength Light Signal* earlier filed in the Korean Industrial Property Office on Jul. 2, 1998, and there duly assigned Serial No. 98-26651 by that Office.

BACKGROUND OF THE INVENTION

1. Field of the Invention

The present invention relates to an optical fiber suitable for amplifying a long wavelength light signal, and more particularly, to a long wavelength optical amplifier whose gain and noise figure characteristics are improved by inserting an isolator between two erbium doped fibers.

2. Description of the Related Art

In an optical fiber communications system, transmission loss can be easily compensated for by using an erbium doped fiber amplifier (EDFA). The EDFA directly amplifies a light signal without converting the light signal into an electrical signal. U.S. Pat. No. 5,768,012 to Raymond Zanoni et al. entitled *Apparatus And Method For The High-Power Pumping Of Fiber Optic Amplifiers* and U.S. Pat. No. 5,673,129 to Victor Mizrahi entitled *WDM Optical Communication Systems With Wavelength Stabilized Optical Selectors* are examples of known optical amplifiers.

EDFAs are used to amplify weak light signals which have been transmitted over a long distance and carry a large amount of data, in order to compensate for the attenuation of the light signals when they are transmitted over a long length of optical fiber. In contrast with a transmission method in which light is converted into an electrical signal to be amplified and then converted back into light, since the EDFA can directly amplify light, it exhibits a good amplification efficiency without the need for optical-to-electrical conversion.

In general, EDFAs have a high gain in the range of 1525 to 1565 nm. If the length of an EDFA is sufficiently increased, a high gain can be obtained even in the range of 1570 to 1610 nm. Therefore, in order to increase the amplification band of an EDFA, two amplifiers having different amplifying bands may be employed.

SUMMARY OF THE INVENTION

It is an object of the present invention to provide a long wavelength optical amplifier using pumped light having a wavelength in the 980 nm band, whose gain and noise figure characteristics are improved by inserting an isolator in the middle of an erbium doped fiber.

It is another object of the present invention to provide a long wavelength optical amplifier using pumped light having a wavelength in the 1480 nm band, whose gain and noise figure characteristics are improved by inserting an isolator in the middle of an erbium doped fiber.

Accordingly, to achieve the above objects, there is provided an erbium doped fiber amplifier (EDFA) for amplifying a received light signal including a pump light source for generating pump light in the 980 nm band, a light coupler for receiving the pump light from the pump light source and coupling the same to the received light signal, first and second optical fibers doped with erbium ions, for amplifying the received light signal by the pump light, and an isolator positioned at a point between the first and second optical fibers, the point, from the input terminal of the first optical fiber, corresponding to 9 to 15% of the combined length of the first and second optical fibers.

According to another aspect of the present invention, there is provided an erbium doped fiber amplifier (EDFA) for amplifying a received light signal including a pump light source for generating pump light in the 980 nm band, a light coupler for receiving the pump light from the pump light source and coupling the same to the received light signal, first and second optical fibers doped with erbium ions, for amplifying the received light signal by the pump light, and an isolator positioned between the first and second optical fibers, wherein the combined length of the first and second optical fibers is 48 to 66 m and the isolator is positioned at a point from the input terminal of the first optical fiber corresponding to 3 to 7% of the combined length of the first and second optical fibers.

According to still another aspect of the present invention, there is provided an erbium doped is fiber amplifier (EDFA) for amplifying a received light signal including a pump light source for generating pump light in the 1480 nm band, a light coupler for receiving the pump light from the pump light source and coupling the same to the received light signal, first and second optical fibers doped with erbium ions, for amplifying the received light signal by the pump light, and an isolator positioned at a point between the first and second optical fibers, the point, from the input terminal of the first optical fiber, corresponding to 11 to 25% of the combined length of the first and second optical fibers.

Alternatively, there is provided an erbium doped fiber amplifier (EDFA) for amplifying a received light signal including a pump light source for generating pump light in the 1480 nm band, a light coupler for receiving the pump light from the pump light source and coupling the same to the received light signal, first and second optical fibers doped with erbium ions, for amplifying the received light signal by the pump light, and an isolator positioned between the first and second optical fibers, wherein the combined length of the first and second optical fibers is 60 to 68 m and the isolator is positioned at a point, from the input terminal of the first optical fiber, corresponding to 7 to 11% of the combined length of the first and second optical fibers.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
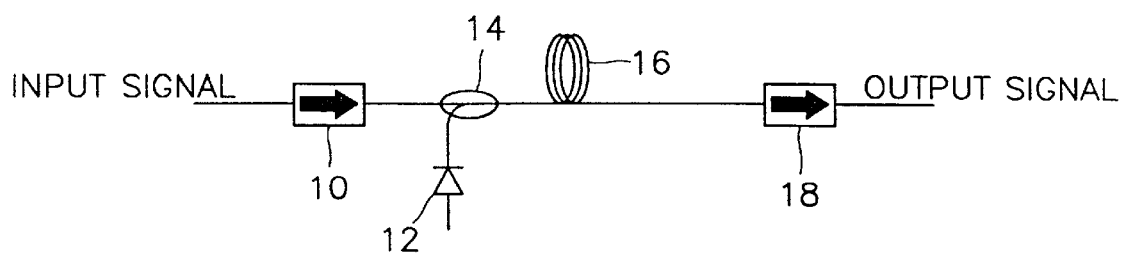
FIG. 1 is a schematic diagram of a general erbium doped fiber amplifier.

FIG. 1 is a schematic diagram of a general EDFA (erbium doped fiber amplifier). The EDFA shown in FIG. 1 includes an isolator 10, a pumping laser diode (PLD) 12, a wavelength selective coupler (WSC) 14, an erbium doped fiber (EDF) 16 and an isolator 18. The principle of operation of an optical amplifier will now be described. First, if pump light with a central wavelength of 980 nm is input by PLD 12, the pump light and a light signal of a wavelength in the 1500 nm band, i.e., the light signal input from an input terminal, pass through EDF 16 which is an amplifying medium doped with a rare earth element such as Er (erbium) via WSC 14. Here, the pump light excites Er ions which are at a ground state in EDF 16. The light signal is amplified by stimulated emission of the excited Er ions. The amplified signal is output through isolator 18. Isolator 10 prevents the amplifying efficiency of the light signal from being lowered due to re-entrance of amplified spontaneous emission (ASE) light which is generated in EDF 16 and reflected from an optical element such as a signal input connector. Likewise, isolator 18 prevents the amplifying efficiency from being lowered due to re-entrance of amplified spontaneous emission (ASE) light which is reflected from an optical element such as a signal output connector to EDF 16. The gain of the optical amplifier varies depending on wavelength. In particular, ASE light in the 1530 nm band is high and the gain of a wavelength in this band is high. Consequently, the gain of light having a wavelength in the 1550 nm band which is frequently used in transmission, is reduced and the noise figure thereof increases, thus causing a large gain difference depending on the wavelength of the optical amplifier. The noise figure is the signal-to-noise ratio at the input terminal and the output terminal.

Figure 2:
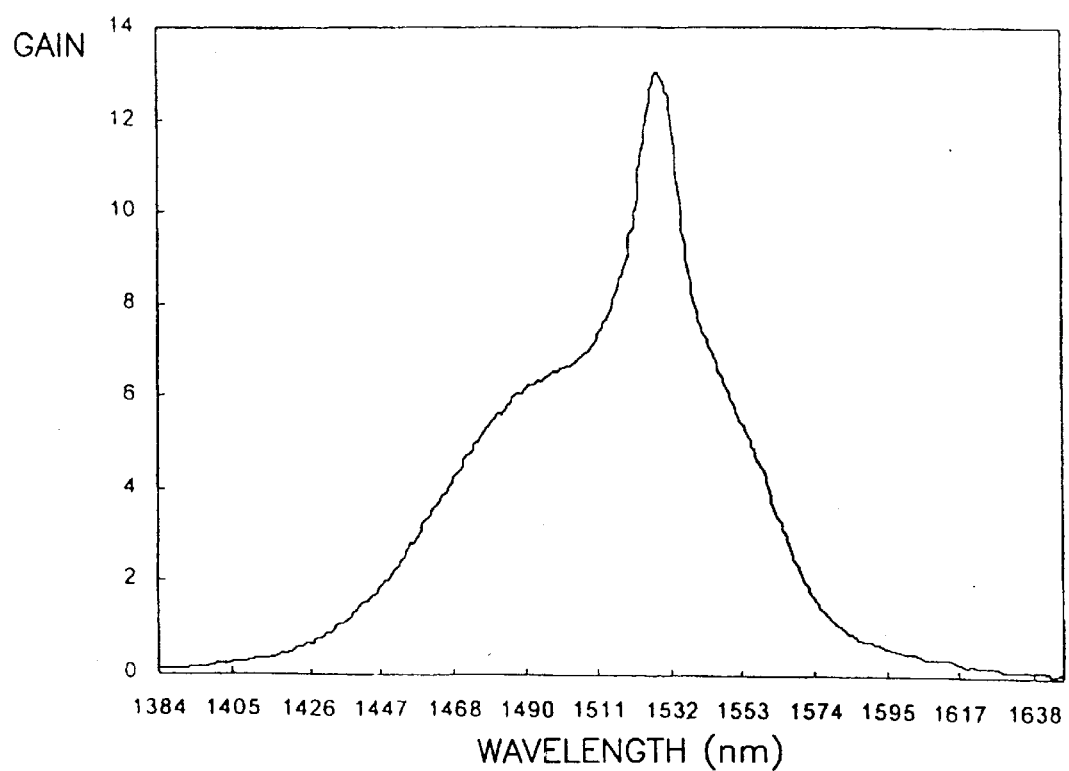
FIG. 2 is a diagram illustrating the absorption spectrum of an erbium doped fiber used for the erbium doped fiber amplifier shown in FIG. 1.

FIG. 2 illustrates the absorption spectrum of the EDF used in the EDFA shown in FIG. 1. As shown in FIG. 2, the absorption of the EDF is large for a wavelength in the range of about 1515 nm to about 1565 nm, and is small for a wavelength in the range of about 1570 nm to about 1610 nm. The longer the EDF, the smaller the gain for light signal in the wavelength range of about 1515 nm to 1565 nm, and the larger the gain for light signal in the wavelength range of about 1570 nm to 1610 nm. Thus, in order to use the EDF as a long wavelength optical amplifier, the length of the EDF should be sufficiently increased. In order to allow long wavelength light signal to have a large gain, unlike the conventional manner in which the length of the EDF is increased, in the present invention, an isolator is installed in the middle of the EDF. Specifically, the present invention provides an EDFA suitable for a long wavelength in the range of 1570 nm to 1610 nm.

Figure 3:
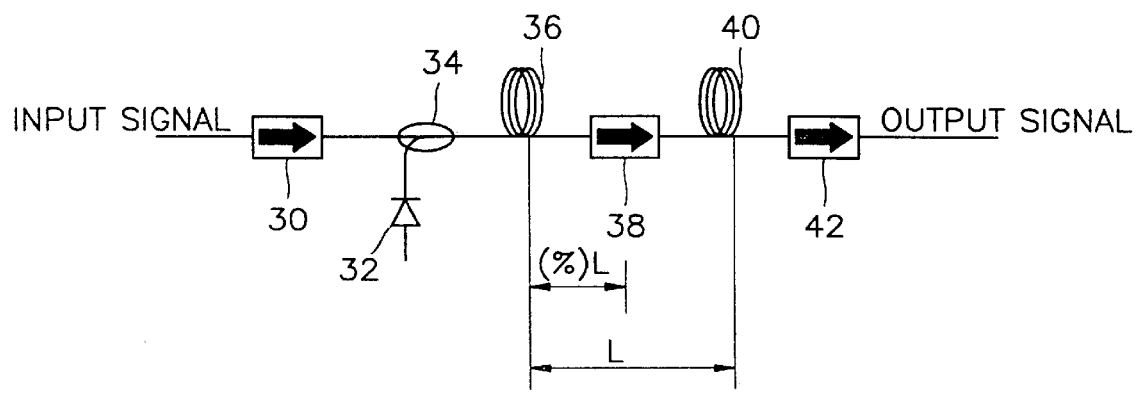
FIG. 3 is a schematic diagram of an erbium doped fiber amplifier according to the present invention.

FIG. 3 is a schematic diagram of an erbium doped fiber amplifier (EDFA) according to the present invention. The EDFA shown in FIG. 3 includes an isolator 30, a pump laser diode (PLD) 32, a wavelength selective coupler (WSC) 34, an EDF 36, an isolator 38, an EDF 40 and an isolator 42. PLD 32 generates pump light in the 980 nm or 1480 nm band. WSC 34 receives the pump light from PLD 32 and couples the same to light signal received from isolator 30. EDFs 36 and 40 amplify the received light signal pumped by PLD 32. Isolator 38 is positioned between EDFs 36 and 40. EDFs 36 and 40 amplify internally generated ASE light as well as the received light signal. Since the amplified ASE light lowers the amplifying efficiency of a light signal, it is necessary to prevent the ASE light from being amplified. Thus, ASE light generated in EDF 40 in the rear stage is prevented from being amplified while traveling toward EDF 36 in the front stage by interposing isolator 38 between EDFs 36 and 40, thereby enhancing the amplifying efficiency of light signal.

In enhancing the amplifying efficiency by interposing an isolator between the EDFs, the position of the isolator is a very important factor. In the present invention, for received light signal having a wavelength in the range of 1570 nm to 1610 nm, the position of isolator 38 for which the improvement of the gain and noise figure become optimal is given. In other words, based on extensive experimentation concerning the gain and noise figure of the EDFA, the optimal position of isolator 38 has been obtained based on the experimental data. The data shown in the following tables are for the case when the pumping power is 100 mW, the signal input power is −40 dBm and the wavelength is 1575 nm.

Table 1 shows experimental data of gains and noise figures of the EDFA with respect to the position of isolator 38 in the case when light in the 980 nm band was pumped by the PLD 32. Here, the length of the EDF was fixed to 21 m, which is the optimal length for an EDF which does not use isolator 38. In the following tables, the position (%) of isolator 38 is represented as a percentile from the input terminal of EDF 36 based on the combined length of EDFs 36 and 40.

TABLE 1

| Isolator position (%) | Gain (dB) | Noise figure (dB) | Remarks |
| --- | --- | --- | --- |
| 0 | 22.09 | 4.15 | |
| 3 | 25.18 | 3.55 | |
| 5 | 26.66 | 3.33 | |
| 7 | 27.59 | 3.23 | |
| 9 | 28.06 | 3.19 | |
| 11 | 28.25 | 3.18 | |
| 13 | 28.30 | 3.19 | Optimal position |
| 15 | 28.21 | 3.21 | |
| 17 | 27.98 | 3.27 | |
| 19 | 27.62 | 3.36 | |
| 21 | 27.20 | 3.45 | |

Table 2 shows experimental data of gains and noise figures of the EDFA with respect to the position of isolator 38 while varying the length of the EDF, when light in the 980 nm band was pumped by the PLD 32.

TABLE 2

| Isolator position (%) | EDF length (m) | Gain (dB) | Noise figure (dB) | Remarks |
| --- | --- | --- | --- | --- |
| 3 | 66 | 30.4575 | 3.2928 | |
| 5 | 58 | 32.0493 | 3.2569 | Optimal condition |
| 7 | 48 | 31.7259 | 3.2886 | |

Table 3 shows experimental data of gains and noise figures of the EDFA depending on the position of isolator 38 when light in the 1480 nm band was pumped by PLD 32. Here, the length of the EDF was fixed to 32 m, which is the optimal length of the EDF when not using isolator 38.

TABLE 3

| Isolator position (%) | Gain (dB) | Noise figure (dB) | Remarks |
| --- | --- | --- | --- |
| 0 | 25.16 | 5.54 | |
| 9 | 30.17 | 4.21 | |
| 11 | 30.57 | 4.16 | |
| 13 | 30.79 | 4.15 | |
| 15 | 30.90 | 4.14 | |
| 17 | 30.94 | 4.15 | Optimal position |
| 19 | 30.92 | 4.17 | |
| 21 | 30.84 | 4.20 | |

TABLE 3-continued

| Isolator position (%) | Gain (dB) | Noise figure (dB) | Remarks |
|---|---|---|---|
| 23 | 30.70 | 4.25 | |
| 25 | 30.50 | 4.33 | |

Table 4 shows experimental data of gains and noise figures of the EDFA depending on the position of isolator 38 while varying the length of the EDF, when light in the 1480 nm band was pumped by PLD 32.

TABLE 4

| Isolator position (%) | EDF length (m) | Gain (dB) | Noise figure (dB) | Remarks |
|---|---|---|---|---|
| 7 | 68 | 32.8151 | 4.1857 | |
| 9 | 63 | 33.1332 | 4.1869 | Optimal condition |
| 11 | 60 | 33.0926 | 4.2222 | |

On the basis of the above experimental data, it is possible to set the optimal position of isolator 38 for attaining an EDFA exhibiting the most desirable characteristics in the range of 1570 nm to 1610 nm. In other words, the position at which the gain of the EDFA is maximum and the noise figure thereof is minimum is set as the optimal position of isolator 38.

Referring to Table 1, under the conditions of pump light being in the 980 nm band being used, and the combined length of the first and second EDFs 36 and 40 being 21 m, when the position of isolator 38 is 9 to 15%, the gain is relatively high, that is, greater than or equal to 28 dB, and the noise figure is relatively low, that is, less than or equal to 3.21 dB. Specifically, when the position of isolator 38 is 13%, the gain is highest, that is, 28.3 dB, and the noise figure is 3.19 dB. Thus, this position is optimal.

Referring to Table 2, under the conditions of pump light in the 980 nm band being used, and the combined length of EDFs 36 and 40 being varied, when the combined length of EDFs 36 and 40 is 48 to 66 m, the gain is relatively high and the noise figure is relatively low. Specifically, when the combined length of EDF 36 and 40 is 58 m and the position of isolator 38 is 5%, the gain is highest, that is, 32 dB, and the noise figure is lowest, that is 3.26 dB. Thus, this position is optimal.

Referring to Table 3, under the conditions of pump light being in the 1480 nm, and the combined length of EDFs 36 and 40 being 32 mn, when the position of isolator 38 is 11 to 25%, the gain is relatively high, that is, greater than or equal to 30.5 dB, and the noise figure is relatively low, that is, less than or equal to 4.33 dB. Specifically, when the position of isolator 38 is 17%, the gain is highest, that is, 30.94 dB, and the noise figure is 4.15 dB. Thus, this position is optimal.

Referring to Table 4, under the conditions of pump light in the 1480 nm band being used, and the combined length of EDFs 36 and 40 being varied, when the combined length of EDFs 36 and 40 is 60 to 68 m, the gain is relatively high and the noise figure is relatively low. Specifically, when the combined length of EDF 36 and 40 is 63 m and the position of isolator 38 is 9%, the gain is highest, that is, 33.13 dB, and the noise figure is 4.19 dB. Thus, this position is optimal.

Also, referring to Tables 1 and 3, it can be seen that the gain was enhanced by about 6 dB in the case of inserting isolator 38 in the optimal position, compared to the case of not using isolator 38. In other words, when using an EDF having a length of 21 m and inserting isolator 38 in the optimal position, the gain has improved from 22.09 dB to 28.30 dB when using pump light in the 980 nm band. And, when using an EDF having a length of 32 m and inserting isolator 38 in the optimal position, the gain has improved from 25.16 dB to 30.94 dB when using pump light in the 1480 nm band.

As described above, in the EDFA according to the present invention, the gain and noise figure of the EDFA using pump light in the 980 nm or 1480 nm band, for amplifying received light signal in a long wavelength band, can be improved by additionally inserting an isolator into a specific position between two adjacent EDFs. Also, an EDFA suitable for amplifying received light signal in the 1570 to 1610 nm band can be attained.

What is claimed is:

1. An erbium doped fiber amplifier for amplifying a received light signal comprising:
   a pump light source for generating pump light in a 980 nm band;
   a light coupler for receiving the pump light from the pump light source and for coupling the pump light to the received light signal;
   first and second optical fibers doped with erbium ions, for amplifying the received light signal by the pump light a combined length of the first and second optical fibers being 21 m; and
   an isolator positioned at a point between the first and second optical fibers, the point corresponding to 10 to 14% of the combined length of the first and second optical fibers from an input terminal of the first optical fiber.

2. The erbium doped fiber amplifier according to claim 1, wherein the isolator is optimally positioned at a point corresponding to 13% of the combined length of the first and second optical fibers from the input terminal of the first optical fiber.

3. An erbium doped fiber amplifier for amplifying received light signal comprising:
   a pump light source for generating pump light in the 980 nm band;
   a light coupler for receiving the pump light from the pump light source and coupling the pump light to the received light signal;
   first and second optical fibers doped with erbium ions, for amplifying the received light signal by the pump light; and
   an isolator positioned between the first and second optical fibers,
   wherein the combined length of the first and second optical fibers is 48 to 66 m and the isolator is positioned at a point corresponding to 3 to 7% of the combined length of the first and second optical fibers from an input terminal of the first optical fiber.

4. The erbium doped fiber amplifier according to claim 3, wherein the combined length of the first and second optical fibers is 58 m and the isolator is positioned at a point corresponding to 5% of the combined length of the first and second optical fibers from the input terminal of the first optical fiber.

5. An erbium doped fiber amplifier for amplifying received light signal comprising:
   a pump light source for generating pump light in the 1480 nm band;

a light coupler for receiving the pump light from the pump light source and coupling the pump light to the received light signal;

first and second optical fibers doped with erbium ions, for amplifying the received light signal by the pump light a combined length of the first and second optical fibers being 32 m; and an isolator positioned at a point between the first and second optical fibers, the point corresponding to 11 to 24% of the combined length of the first and second optical fibers from an input terminal of the first optical fiber.

6. The erbium doped fiber amplifier according to claim 5, wherein the isolator is optimally positioned at a point corresponding to 17% of the combined length of the first and second optical fibers from the input terminal of the first optical fiber.

7. An erbium doped fiber amplifier for amplifying received light signal comprising:

a pump light source for generating pump light in the 1480 nm band;

a light coupler for receiving the pump light from the pump light source and coupling the pump light to the received light signal;

first and second optical fibers doped with erbium ions, for amplifying the received light signal by the pump light; and an isolator positioned between the first and second optical fibers, wherein the combined length of the first and second optical fibers is 60 to 68 m and the isolator is positioned at a point corresponding to 7 to 11% of the combined length of the first and second optical fibers from an input terminal of the first optical fiber.

8. The erbium doped fiber amplifier according to claim 7, wherein the combined length of the first and second optical fibers is 63 m and the isolator is positioned at a point corresponding to 9% of the combined length of the first and second optical fibers from the input terminal of the first optical fiber.

9. The erbium doped fiber amplifier according to claim 1, wherein the received light signal is in a 1570 to 1610 nm band.

10. The erbium doped fiber amplifier according to claim 3, wherein the received light signal is in a 1570 to 1610 nm band.

11. The erbium doped fiber amplifier according to claim 5, wherein the received light signal is in a 1570 to 1610 nm band.

12. The erbium doped fiber amplifier according to claim 7, wherein the received light signal is in a 1570 to 1610 nm band.

* * * * *